(12) United States Patent
Deng et al.

(10) Patent No.: US 10,300,882 B2
(45) Date of Patent: *May 28, 2019

(54) DUAL CHAMBER AIRBAG WITH ASYMMETRICALLY TUNABLE PARAMETERS AND METHOD OF MANUFACTURING THE SAME

(71) Applicant: Ford Global Technologies, LLC, Dearborn, MI (US)

(72) Inventors: Zhibing Deng, Northville, MI (US); Deepak Patel, Canton, MI (US); Tzu-Chen Weng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,322

(22) Filed: Oct. 16, 2017

(65) Prior Publication Data

US 2018/0037187 A1 Feb. 8, 2018

Related U.S. Application Data

(63) Continuation of application No. 14/930,430, filed on Nov. 2, 2015, now Pat. No. 9,789,844.

(51) Int. Cl.
*B60R 21/206* (2011.01)
*B60R 21/231* (2011.01)
(Continued)

(52) U.S. Cl.
CPC .......... *B60R 21/261* (2013.01); *B60R 21/206* (2013.01); *B60R 21/231* (2013.01);
(Continued)

(58) Field of Classification Search
CPC ... B60R 21/231; B60R 21/233; B60R 21/261; B60R 21/206; B60R 21/2338;
(Continued)

(56) References Cited

U.S. PATENT DOCUMENTS 5,562,302 A 10/1996 Turnbull
6,685,217 B2 2/2004 Abe
(Continued)

FOREIGN PATENT DOCUMENTS

DE 10355764 B3 5/2005
DE 102011053863 A1 3/2013
(Continued)

OTHER PUBLICATIONS

Search Report dated May 9, 2017 for Great Britain Patent Application No. GB 1618471.5 (5 pages).

*Primary Examiner* — Faye M Fleming
(74) *Attorney, Agent, or Firm* — Frank Lollo; James P. Muraff; Neal Gerber & Eisenberg LLP

(57) ABSTRACT

Embodiments include a vehicle airbag assembly comprising an airbag including a first chamber and a second chamber, a first internal vent permitting gas entry into the first chamber, and a second internal vent permitting gas entry into the second chamber, where the first chamber has a greater volume than the second chamber in an inflated state of the airbag, and the first internal vent is configured for a larger gas flow than the second internal vent. Embodiments also include a vehicle airbag assembly comprising an airbag including a first chamber and a second chamber and at least one internal tether coupled to the second chamber for restricting an inflated depth of the second chamber, where the first chamber has an unrestricted depth and a volume that is larger than a volume of the second chamber in an inflated state of the airbag.

14 Claims, 4 Drawing Sheets

(51) Int. Cl.
B60R 21/239 (2006.01)
B60R 21/261 (2011.01)
B60R 21/2338 (2011.01)

(52) U.S. Cl.
CPC .. B60R 21/239 (2013.01); *B60R 2021/23169* (2013.01); *B60R 2021/23382* (2013.01); *B60R 2021/2615* (2013.01)

(58) Field of Classification Search
CPC ........... B60R 2021/23382; B60R 2021/23169; B60R 2021/2615; B60R 21/239
See application file for complete search history.

(56) References Cited

U.S. PATENT DOCUMENTS

| | | | |
|---|---|---|---|
| 7,364,188 B2 | 4/2008 | Hasebe | |
| 7,393,011 B2 | 7/2008 | Keshavaraj | |
| 7,857,347 B2 | 12/2010 | Abe | |
| 7,963,550 B2 | 6/2011 | Hong | |
| 8,215,667 B2 | 7/2012 | Matsushima | |
| 8,272,667 B2 * | 9/2012 | Schneider | B60R 21/206 280/728.2 |
| 8,292,323 B2 | 10/2012 | Matsushima | |
| 8,376,396 B2 | 2/2013 | Miller et al. | |
| 8,764,056 B2 | 7/2014 | Wipasuramonton | |
| 9,027,696 B2 | 5/2015 | Park | |
| 9,180,835 B2 | 11/2015 | Fukawatase | |
| 9,428,140 B2 | 8/2016 | Lee | |
| 9,789,844 B2 * | 10/2017 | Deng | B60R 21/206 |
| 2002/0171232 A1 | 11/2002 | Abe | |
| 2003/0034638 A1 | 2/2003 | Yoshiba | |
| 2006/0076758 A1 | 4/2006 | Yokoyama | |
| 2007/0200321 A1 | 8/2007 | Heitplatz | |
| 2015/0115579 A1 | 4/2015 | Abramoski et al. | |
| 2016/0001735 A1 | 1/2016 | Quatanens | |
| 2017/0028957 A1 | 2/2017 | Park et al. | |

FOREIGN PATENT DOCUMENTS

| | | |
|---|---|---|
| EP | 1285821 A2 | 2/2003 |
| JP | 2006088856 A | 4/2006 |
| JP | 2007055608 A | 3/2007 |
| JP | 2008149965 A | 7/2008 |
| JP | 2010241241 A | 10/2010 |
| WO | WO 2010081503 A1 | 7/2010 |

* cited by examiner

DUAL CHAMBER AIRBAG WITH ASYMMETRICALLY TUNABLE PARAMETERS AND METHOD OF MANUFACTURING THE SAME

CROSS REFERENCE TO RELATED APPLICATION

This application is a continuation application of U.S. patent application Ser. No. 14/930,430, filed on Nov. 2, 2015. This prior application is hereby incorporated by reference in its entirety.

TECHNICAL FIELD

This application generally relates to supplemental restraint systems in an automotive vehicle and more specifically, to dual chamber knee airbags with asymmetrically tunable design parameters.

BACKGROUND

Most automotive vehicles include some form of supplemental restraint system, such as, for example, an inflatable airbag, that supplements the seatbelt system of the vehicle to enhance protection of a vehicle occupant during a load event (e.g., vehicle impact or collision). For example, a typical frontal impact causes the occupant (e.g., driver or passenger) to move forward toward a dashboard (or instrument panel), glove compartment (or glove box), or other vehicle compartment. Accordingly, the supplemental restraint system can include one or more airbags that are deployed in front of the vehicle occupant to substantially prevent the occupant from impacting the front compartment(s) of the vehicle.

One type of frontal airbag is a knee airbag that deploys in front of the lower legs and/or knees of the occupant to help prevent impact with lower portions of the vehicle compartments. Many knee airbags include a single internal chamber that spreads laterally upon deployment in order to evenly cover both legs of the occupant. However, such knee airbags typically do not account for load events that occur off-center or at an angle to a direction of motion of the vehicle (such as, e.g., an offset impact, a "small offset, rigid barrier" (SORB) impact, an angle impact, etc.) and therefore, cause the occupant to move laterally within the vehicle cabin, for example, towards a door or center console of the vehicle, in addition to moving forward. Further, many existing knee airbags do not account for other forms of uneven intrusion, or load distribution, on the knees and/or legs of the occupant during an impact, for example, due to an uneven engine compartment package in the vehicle cabin, a sweep of a lower portion of the instrument panel or glove box (e.g., in the area adjacent to the knees or legs of the occupant), or a difference in stiffness between the instrument panel, the glove box, the center console, or other vehicle compartment.

For example, one existing knee airbag has a non-symmetrical, single-chamber design comprising an enlarged, thicker portion at the end of the airbag that faces an outboard side of the vehicle, so as to limit both lateral and forward movement of the occupant during a load event. However, the frontal or main portion of the airbag has a uniform thickness and stiffness that does not account for uneven intrusions within the vehicle cabin that may affect the load distribution on at least a front side of the knees and/or legs, or an amount of energy that is expected to be absorbed at the different contact areas.

Other existing knee airbags have multi-chamber designs with uneven volumes, air pressures, or inflation timings to vary the coverage applied to different knees and/or areas of the legs. However, an overall shape, volume, and stiffness of each chamber in such knee airbags cannot be individually, or asymmetrically, tuned to account for, for example, a geometry of the various compartments within the vehicle cabin or an expected amount of energy to be absorbed upon occupant contact with the chamber.

Accordingly, there still exists a need for an improved knee airbag that can be asymmetrically configured according to uneven intrusions on the airbag, including vehicle cabin geometry, so as to provide an appropriate load distribution to each knee and/or leg of the vehicle occupant in various types of impacts (e.g., frontal impact, offset impact, angle impact, etc.).

SUMMARY

The invention is intended to solve the above-noted problems by providing systems and methods for a dual chamber knee airbag with design parameters that can be asymmetrically tuned with respect to each chamber, thereby providing an airbag that can be customized according to a geometry of the vehicle cabin and other factors contributing to an uneven intrusion on the airbag.

For example, one embodiment provides a vehicle airbag assembly comprising an airbag including a first chamber and a second chamber, the first chamber having a greater volume than the second chamber in an inflated state of the airbag; a first internal vent permitting gas entry into the first chamber; and a second internal vent permitting gas entry into the second chamber, the first internal vent configured for a larger gas flow than the second internal vent.

Another example embodiment provides a vehicle airbag assembly comprising an airbag including a first chamber and a second chamber and at least one internal tether coupled to the second chamber for restricting an inflated depth of the second chamber, where the first chamber has an unrestricted depth and a volume that is larger than a volume of the second chamber in an inflated state of the airbag.

As another example, one embodiment provides a method of manufacturing a vehicle airbag. The method comprises forming a first airbag chamber having a first width selected according to a vehicle outboard configuration; forming a second airbag chamber having a second width selected according to a vehicle inboard configuration; forming a first vent for permitting a first gas flow into the first airbag chamber; and forming a second vent for permitting a second gas flow into the second airbag chamber.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
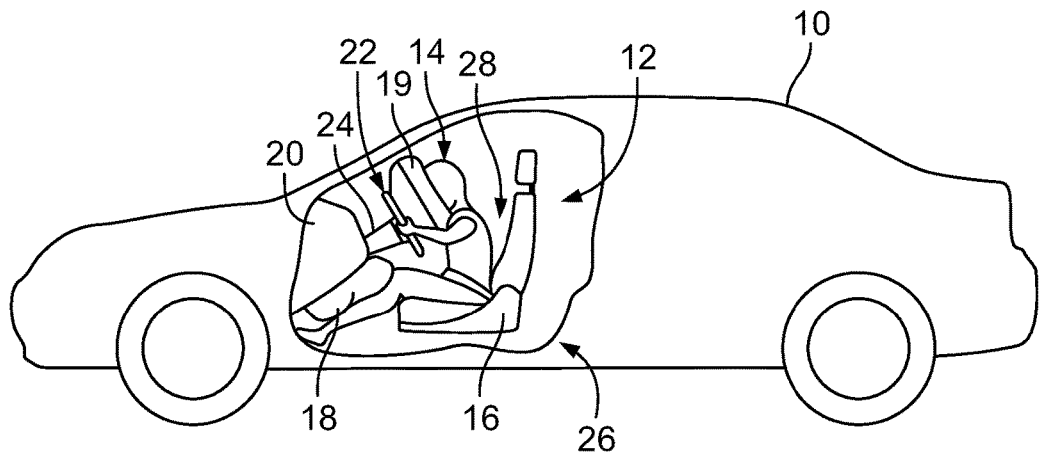
FIG. 1 is a side view of an exemplary vehicle with an example knee airbag in an inflated state, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an example vehicle 10 comprising a cabin area 12 designed to seat at least a front-seat occupant 14 in a front seat 16. The illustrated embodiment shows a driver side of the vehicle 10, wherein the front-seat occupant 14 is a driver of the vehicle 10 and the front seat 16 is a driver's seat. Though not shown, the cabin area 12 (or passenger compartment) can also include a front seat on a passenger side of the vehicle 10 and, in some cases, one or more rear passenger seats or rows of seats. Further, while the vehicle 10 is shown as a sedan or coupe in FIG. 1, it will be appreciated that the vehicle 10 may be any type of motor vehicle, including, but not limited to, a sports utility vehicle (SUV), minivan, van, truck, station wagon, etc. Moreover, while the vehicle 10 is shown as a left-hand drive vehicle, in other embodiments the vehicle 10 may be a right-hand drive vehicle.

Figure 2:
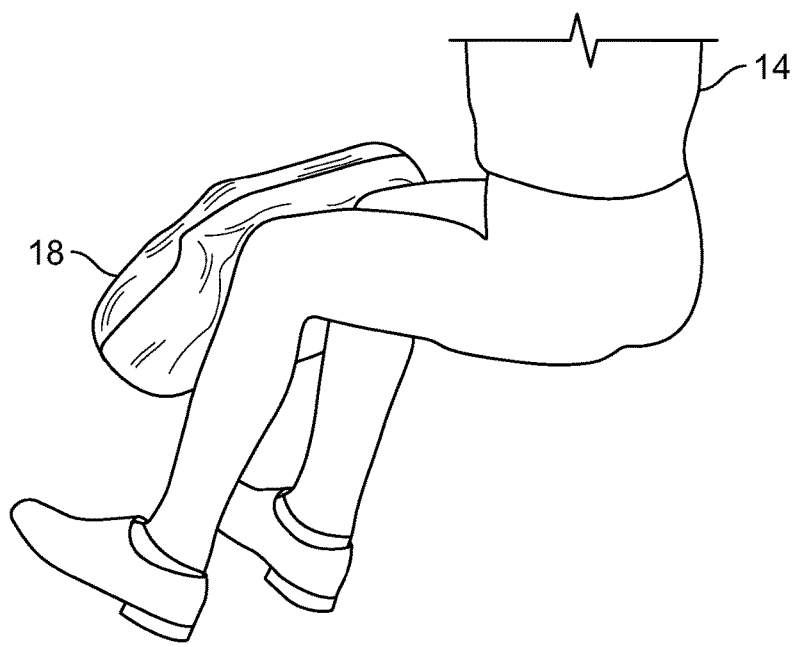
FIG. 2 is a rear perspective view of the exemplary knee airbag shown in FIG. 1, in accordance with certain embodiments.

As illustrated, the cabin area 12 includes a knee airbag 18 that has been deployed from a lower portion of a dashboard 20 (also referred to as an "instrument panel") of the vehicle 10. As also shown in FIG. 2, the knee airbag 18 is designed to contact lower regions (e.g., knees and/or lower legs) of the front-seat occupant 14 when in a fully deployed or inflated state. The cabin area 12 may also include other supplemental restraint system (SRS) devices, such as, for example, a driver airbag 19 that may be deployed from a steering wheel 22 attached to a steering column 24, and/or a side impact airbag (not shown) that may be deployed from a vehicle door or other compartment on an outboard side 26 of the vehicle 10. While the knee airbag 18 is shown in the driver side of the cabin area 12, it should be appreciated that the knee airbag 18 may also be installed in the passenger side of the vehicle 10 (e.g., deployed from a lower portion of a glove compartment of the vehicle 10) and/or in front of one or more rear passenger seats. The airbag 18 can be made of or formed from any material that is suitable for use in airbags.

Though not shown, the outboard side 26 can include one or more vehicle doors, one or more vehicle pillars, and/or any other compartments located on the outer sides of the vehicle 10. The vehicle 10 can further include an inboard side 28 comprising a center console (not shown) and other interior compartments of the vehicle 10. In some cases, the dashboard 20 can be considered to include the steering column 24 and/or the steering wheel 22 extending therefrom, in addition to the instrument panel or cluster positioned behind the steering column 24. Also in some cases, the glove compartment may be considered an extension of the dashboard 20, or at least coupled to a portion of the dashboard 20 that extends into the passenger side of the vehicle 10. Thus, as used herein, the term "dashboard" can refer to any combination of these vehicle components.

In certain frontal load events (e.g., angle impact, offset impact, SORB impact, etc.), an angle of the impact, relative to the direction of travel of the vehicle 10, can cause an uneven intrusion into the cabin area 12, resulting in forward movement of the front-seat occupant 14 toward the dashboard 20, as well as lateral movement of the occupant 14 towards, for example, the outboard side 26 or the inboard side 28. In some cases, the load event may also cause rearward and/or lateral movement of the dashboard 20 or other compartment of the vehicle 10 (e.g., the steering column 24, the steering wheel 22, outboard compartments, inboard compartments, etc.). An intrusion into the cabin area 12 can also be made uneven due to the internal characteristics of the vehicle 10, including, but not limited to, an uneven engine compartment package, a stiffness of the materials used for different compartments in the cabin area 12, and a configuration of the compartments in the cabin area 12, such as, for example, a geometry of the lower portion of the dashboard 20 (or, in the case of a passenger side airbag, the lower portion of the glove compartment), a geometry of the outboard side 26 (e.g., geometries of the vehicle door, pillar(s), and any other outboard compartments), a geometry of the inboard side 28 (e.g., geometries of the center console and any other inboard compartments), and the like. For example, as shown in FIG. 1, the lower portion of the dashboard 20 may sweep away from the steering column 24 and towards a floor of the vehicle 10, and an angle of this sweep, and any protrusions or recesses therein, can cause the dashboard 20 to unevenly impact the lower legs of the occupant 14 in a load event.

Such uneven intrusions can place different loads on the left and right knees, or legs, of the occupant 14 upon contacting the knee airbag 18. For example, on the driver side, the left-hand side (LHS) load may be greater than the right-hand side (RHS) load, while on the passenger side, the RHS load may be greater than the LHS load, due at least partially to the difference in geometry and stiffness of the dashboard 20 and the glove compartment, and in some cases, that of the inboard and/or outboard compartments. Embodiments of the knee airbag 18 are configured to distribute the LHS and RHS loads more evenly and thereby, help place a lower peak load on each leg of the occupant 14. As described in more detail below with respect to FIGS. 3-6, the knee airbag 18 can achieve more even load distribution through use of two asymmetrically-configured chambers (e.g., a LHS chamber and a RHS chamber), where each chamber is individually tuned based on the stiffness and/or configuration of the one or more vehicle compartment(s) that may contact said chamber upon deployment of the airbag 18.

Figure 3:
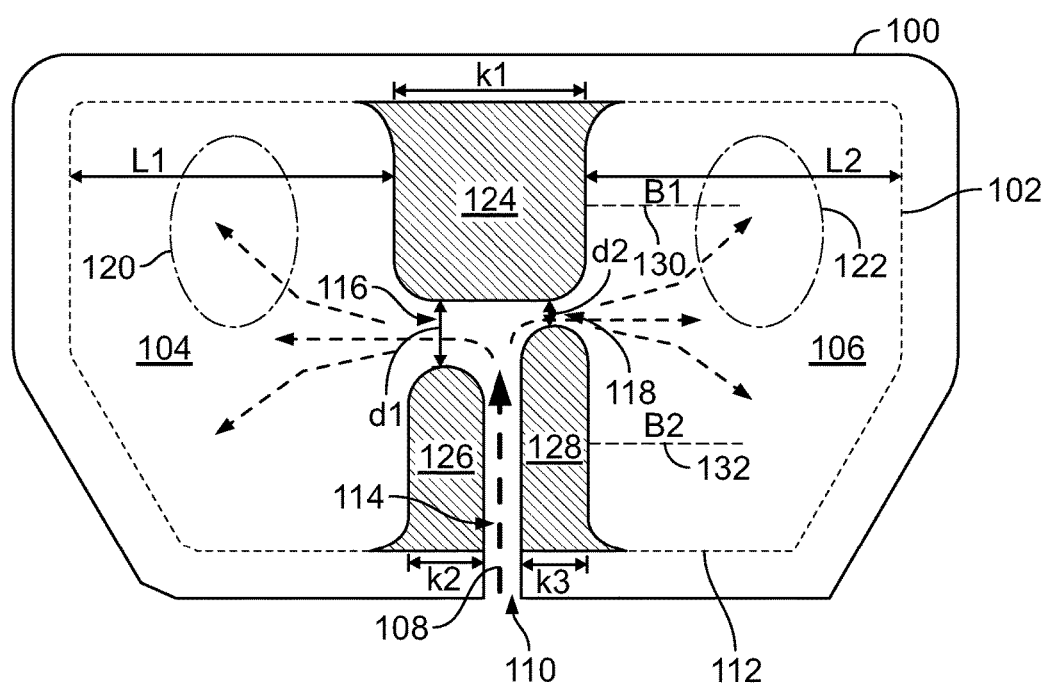
FIG. 3 is a cross-sectional view of an exemplary airbag assembly, in accordance with certain embodiments.

Referring now to FIG. 3, shown is a cross-sectional view of an example vehicle airbag assembly 100 comprising a dual-chamber airbag 102 (or airbag cushion) that is configured to include a first chamber 104 and a second chamber 106, in accordance with embodiments. In a preferred embodiment, the airbag assembly 100 is included in, or forms, the knee airbag 18 shown in FIGS. 1 and 2. In other embodiments, the airbag assembly 100 may be included in another inflatable supplemental restraint system device, such as, for example, a side-impact airbag or other airbag device designed for another location of the vehicle 10. When not in use, the airbag assembly 100 can be stowed in a deflated, or at least partially deflated, state within a designated vehicle compartment (e.g., in a lower portion of the dashboard or glove compartment). Upon detection of a load event, the airbag assembly 100 can be inflated to a deployed state (e.g., as shown in FIGS. 1 and 2) by introducing a sufficient amount of gas 108 (or inflation fluid) through a gas inlet 110 positioned at an external wall 112 of the airbag 102 and/or the airbag assembly 100.

As illustrated, the gas 108 (or inflator gas) can enter the airbag 102 at the gas inlet 110, travel through an internal passageway 114 of the airbag 102, and then flow into each of the first and second chambers 104, 106. The internal passageway 114 can be formed between the first and second chambers 104, 106 and can be connected to the gas inlet 110 at an intake end of the passageway 114, as shown. The airbag assembly 100 includes a first internal vent 116 for permitting gas entry into the first chamber 104 and a second, opposing internal vent 118 for permitting gas entry into the second chamber 106. Each of the vents 116, 118 can be connected to the passageway 114 at a distal or internal end of the passageway 114 that is opposite the gas inlet 110.

As shown in FIG. 3, the two chambers 104 and 106 are positioned side-by-side, or in parallel to each other and are configured to impact or contact a respective one of the knees, or other leg regions, of a vehicle occupant (e.g., the front-seat occupant 14) at contact locations 120, 122, respectively, when deployed. In embodiments, the first chamber 104 is configured to receive a greater load than the second chamber 106 and therefore, may be placed towards a vehicle side (e.g., outboard side or inboard side) where structural intrusion is higher, a greater concentration of hot points exists, or more generally, a greater amount of incoming energy is expected. For example, in a typical vehicle impact, a greater amount of incoming energy can be expected at the outboard sides of the vehicle, while a smaller amount of incoming energy can be expected at the inboard sides. Accordingly, the airbag assembly 100 shown in FIG. 3 may be installed in a driver side of a left-hand drive vehicle (e.g., the vehicle 10 in FIG. 1) or a passenger side of a right-hand drive vehicle, so that the first chamber 104 is positioned towards the outboard side 26 for receiving a left knee of the front-seat occupant 14 at the contact location 120 and the second chamber 106 is positioned towards the inboard side 28 for receiving a right knee of the front-seat occupant 14 at the contact location 122.

As will be appreciated, in order to configure the airbag assembly 100 for installation in, for example, a front passenger side of the left-hand drive vehicle or a driver side of a right-hand drive vehicle, the airbag assembly 100 need only be reversed or flipped, so as to form a mirror image of the configuration shown in FIG. 3. For example, in such cases, the second chamber 106 can be placed on the left side of the airbag 102 in order to receive the left knee of the front-seat occupant 14 at the contact location 122, and the first chamber 104 can be placed on the right side of the airbag 102 in order to receive the right knee of the occupant 14 at the contact location 120.

According to embodiments, in order for the first chamber 104 to receive a greater load, or absorb more energy, than the second chamber 106, the first chamber 104 is generally designed to have a larger volume and/or greater stiffness than the second chamber 106. However, the exact configuration or geometry of each of the chambers 110 and 112, and the overall airbag assembly 100, can be specifically configured to accommodate a cabin configuration of the vehicle and/or a placement of the airbag assembly 100 within the vehicle (e.g., LHS or RHS). In particular, the airbag assembly 100 is arranged to provide a plurality of design parameters that can be asymmetrically tuned, for example, by an airbag manufacturer, so that each of the chambers 104 and 106 has an appropriate or required amount of volume, stiffness, size or coverage (e.g., length, width, depth, etc.), and/or energy absorption for handling the individual knee or leg region that it contacts.

In embodiments, the design parameters stem, at least partially, from the placement of one or more internal baffles (e.g., baffles 124, 126, and 128 in FIG. 3) in the airbag 102 between the first chamber 104 and the second chamber 106. The baffles can be configured to (i) form a barrier or seal between the chambers 104 and 106 for substantially preventing passage of the inflator gas 108 through the internal walls of the chambers 104 and 106, and (ii) form the vents 116 and 118, as well as the passageway 114, that permit gas entry into the chambers 104 and 106, respectively, for example, as described in more detail below. In embodiments, the baffles define each of the chambers 104 and 106 by forming at least one internal wall of the first chamber 104 and at least one internal wall of the second chamber 106. The baffles can be inert portions of the airbag 102 that do not inflate upon introduction of the gas 108 into the internal passageway 114. For example, the baffles may be formed within the material of the airbag 102 by stitching, adhering or otherwise sealing together the areas of the airbag material that will serve as the baffles. While a specific embodiment of the baffles is described below and shown in FIG. 3, it will be appreciated that other techniques may be used to form a tunable, vented barrier between the first and second chambers 104 and 106 in accordance with the principles disclosed herein.

Referring again to FIG. 3, the airbag assembly 100 includes a first baffle 124 that is configured to form a barrier between an upper region of the first chamber 104 and an upper region of the second chamber 106. As shown, a first wall of the first baffle 124 defines an upper internal wall of the first chamber 104, and a second, opposing wall of the first baffle 124 defines an upper internal wall of the second chamber 106. The airbag assembly 100 further includes a second baffle 126 that is configured to define a lower internal wall of the first chamber 104 and form a barrier between a lower region of the first chamber 104 and the internal passageway 114. Further, the airbag assembly 100 includes a third baffle 128 configured to define a lower internal wall of the second chamber 106 and form a barrier between a lower region of the second chamber 106 and the internal passageway 114. As shown in FIG. 3, a length of the internal passageway 114 can be defined by, or formed between, opposing outer walls of the second and third baffles 126 and 128, and the distal end of the passageway 114 can be defined by the lateral wall of the first baffle 124.

As shown in FIG. 3, the first chamber 104 has a width L1 measured from an external side wall of the chamber 104 to one of the internal walls formed by the first baffle 124 and the second baffle 126. Likewise, the second chamber 106 has a width L2 measured from an opposing external side wall of the chamber 106 to one of the internal walls formed by the first baffle 124 and the third baffle 126. In embodiments, each of the widths L1 and L2 can serve as individually-tunable design parameters for achieving a desired volume, size, and/or coverage for the chambers 104 and 106, respectively. In a preferred embodiment, the width L1 is configured to be greater than the width L2, so that the size and volume of the first chamber 104 is larger than that of the second chamber 106. In other embodiments, the width L1 may be equal to the width L2, and other design parameters may be configured to achieve a larger volume for the first chamber 104. In some cases, the width L1 can be selected to provide appropriate coverage of a portion of the dashboard that is towards an outboard side of the vehicle and any other nearby vehicle compartments. Likewise, the width L2 can be selected to provide appropriate coverage of a portion of the dashboard that is towards an inboard side of the dashboard and any other nearby vehicle compartments.

Another tunable design parameter may be the width of the internal passageway 114. For example, the width of the passageway 114 may be selected so as to generate an amount of gas pressure that is sufficient or required to inflate the first and second chambers 104 and 106. The width of the passageway 114 may also be selected so as to provide an amount of gas input at each of the vents 116 and 118 that is required to obtain a desired stiffness in the chambers 104 and 106, respectively. The desired stiffness for each chamber 104, 106 may be determined based on, for example, a stiffness of the vehicle compartments adjacent to the chamber 104, 106 and/or an amount of energy expected to be absorbed by the chamber 104, 106.

In the illustrated embodiment, each of the baffles 124, 126, and 128 has a width k1, k2, and k3, respectively that can also serve as tunable design parameters. In some embodiments, the widths k1, k2, and k3 can be tuned to adjust the width L1 of the first chamber 104, the width L2 of the second chamber 106, and/or the width of the internal passageway 114 there between, for example, if the overall dimensions (e.g., total width) of the airbag 102 are fixed. As can be seen in FIG. 3, a total width of the airbag 102 can be equal to a sum of the width L1 of the first chamber 104, the width k1 of the first baffle 124, and the width L2 of the second chamber 106. Further, the width k1 of the first baffle 124 can be equal to a sum of the width k2 of the second baffle 126, the width of the internal passageway 114, and the width k3 of the third baffle 128. Accordingly, adjustments to any of the widths k1, k2, and k3 can affect a total volume and/or stiffness of each of the chambers 104 and 106, as well as an amount of gas input and pressure introduced into the airbag 102 via the internal passageway 114.

In embodiments, the vents 116 and 118 can be formed by the baffles 124, 126, and 128. For example, as shown in FIG. 3, the second and third baffles 126 and 128 are positioned substantially parallel to each other and configured to protrude substantially perpendicular to a lateral wall of the first baffle 124 but not extend fully to said lateral wall. A remaining space or gap between the lateral wall of the baffle 124 and each protruding end of the baffles 126 and 128 can form or provide the vents 116 and 118, respectively. In embodiments, a height of each of the baffles 124, 126, and 128 can be used as design parameters for selecting a desired height d1 for the first vent 116 and a desired height d2 for the second vent 118. Further, the resulting heights d1 and d2 can serve as design parameters for determining the amount of gas input through each of the vents 116 and 118 and thereby, the stiffness of each of the chambers 104 and 106 upon deployment. In a preferred embodiment, the height d1 of the first vent 116 is configured to be greater than the height d2 of the second vent 118, such that more of the inflator gas 108 flows into, or enters, the first chamber 104 than the second chamber 106 and so that the first chamber 104 has a greater stiffness than the second chamber 106. In other embodiments, the height d1 can be equal to the height d2, and other design parameters can be configured to achieve a greater stiffness in the first chamber 104.

In embodiments, the airbag assembly 100 can include one or more internal tethers (also referred to as "buffers" or "panels") that are coupled to the front and rear walls of the second chamber 106 in order to restrict a depth or thickness of the second chamber 106, as compared to the first chamber 104, and thereby, reduce the volume of the second chamber 106 and the amount of gas input required to inflate the second chamber 106. For example, in FIG. 3, the second chamber 106 includes a first tether 130 and a second tether 132 positioned in parallel to each other and coupled, on one side, to the first and third baffles 124 and 128, respectively. In a preferred embodiment, each of the tethers 130 and 132 has a width B1 and B2, respectively, that is less than the width L2 of the second chamber 106, such that the tethers 130 and 132 do not span across the entire chamber 106. In other embodiments, the widths B1 and B2 may be equal to the width L2. The tethers 130 and 132 serve to reduce a depth of the second chamber 106 relative to the depth of the first chamber 104, so that the first chamber 10 can provide fuller or deeper coverage. For example, the first chamber 104 may require more stiffness, volume, or depth, for example, in order to protect the occupant from impact with the outboard compartments of the vehicle.

In embodiments, the widths B1 and B2 can serve as tunable design parameters for adjusting the volume and/or stiffness of the second chamber 106 when inflated. For example, larger B1 and B2 values can result in a smaller overall volume and/or less stiffness for the second chamber 106, and may cause more of the inflator gas 108 to be pushed into the first chamber 104. In embodiments, the values for the widths B1 and B2 can be selected based on the configuration or geometry of the dashboard (e.g., the portion of the dashboard 20 that is towards the inboard side 28) and the inboard compartments (e.g., the center console) of the vehicle.

Figure 4:
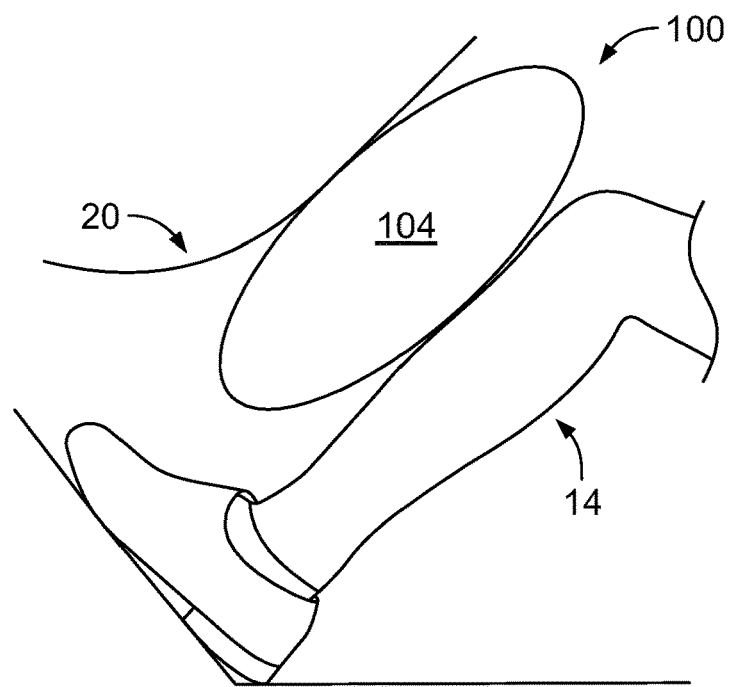
FIG. 4 is a side view of an example chamber in the airbag assembly of FIG. 3, in accordance with certain embodiments.
Figure 5:
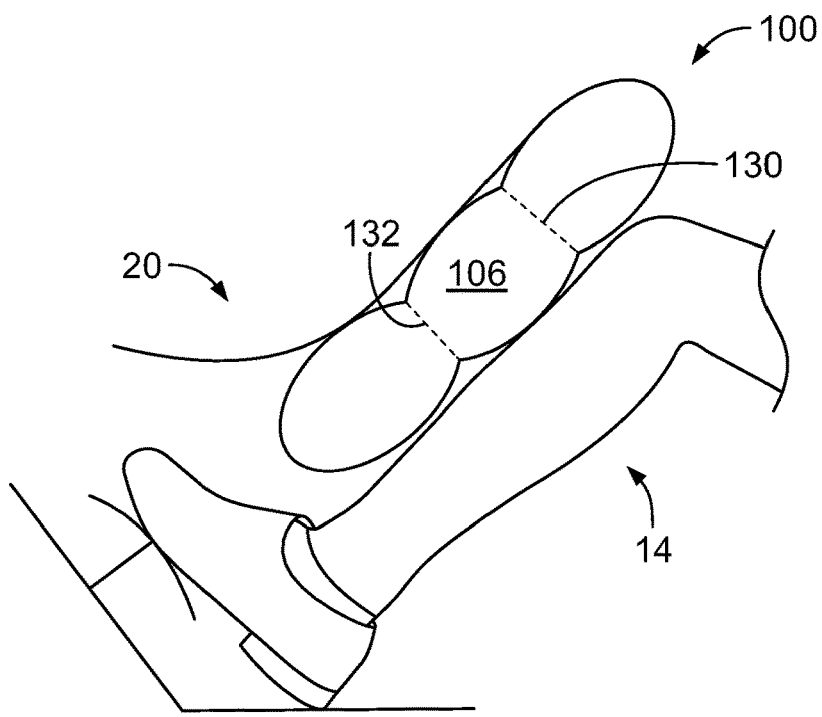
FIG. 5 is a side view of another example chamber in the airbag assembly of FIG. 3, in accordance with certain embodiments.

Referring additionally to FIGS. 4 and 5, FIG. 4 shows an example side view of the first chamber 104 of the airbag assembly 100 in an inflated state, and FIG. 5 shows an example side view of the second chamber 106 of the airbag assembly 100 in an inflated state, but with the first chamber 104 removed for ease of depiction. As shown in FIG. 4, because the first chamber 104 does not include any tethers or buffers, the first chamber 104 can be inflated to an unrestricted, or full, depth. As illustrated in FIG. 5, because the second chamber 106 includes the tethers 130 and 132, the second chamber 106 has a restricted depth at least where the tethers 130 and 132 are coupled to the front and rear walls of the second chamber 106. In some cases, the design parameter values for the first and second chambers 104 and 106 may be substantially equivalent (e.g., equal L1 and L2 values, equal d1 and d2 values, etc.), but for the presence of the tethers 130, 132 in the second chamber 106. In such cases, the tethers 130 and 132 serve to decrease the volume and depth of the second chamber 106, as compared to that of the first chamber 104. Moreover, the B1 and B2 parameters can be adjusted to achieve a desired volume and/or stiffness for the second chamber 106.

Figure 6:
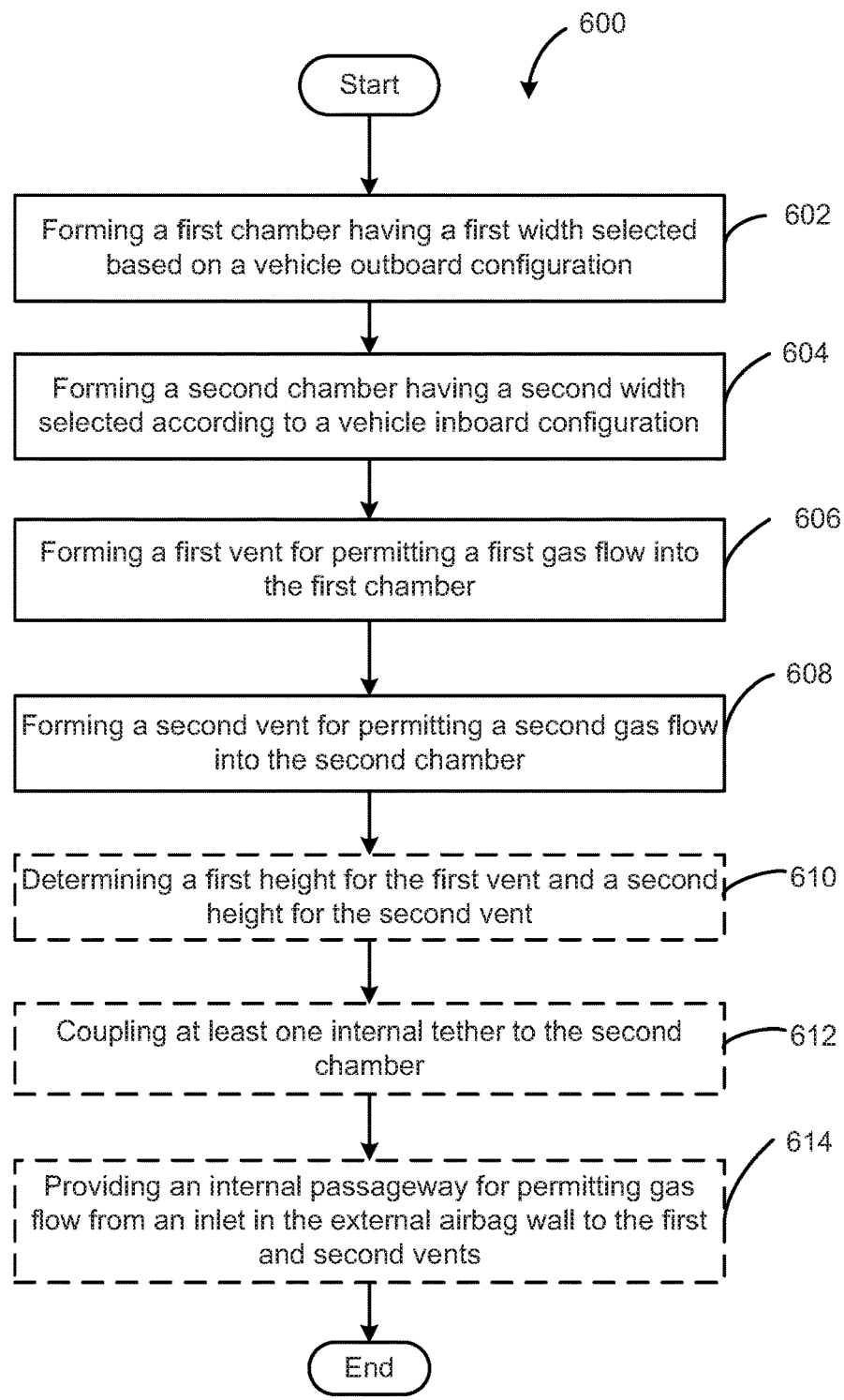
FIG. 6 is a flow diagram of an exemplary method of manufacturing a vehicle airbag in accordance with certain embodiments.

FIG. 6 depicts an example method 600 of manufacturing a vehicle airbag, in accordance with embodiments. The method 600 may be utilized to manufacture a knee airbag, (such as, e.g., the airbag assembly 100) that is specifically tailored to the configuration of the vehicle cabin in which the airbag is to be installed.

The method 600 can include, at step 602, forming a first chamber (e.g., the first chamber 104) having a first width (e.g., the width L1) selected according to a vehicle outboard configuration. For example, the width of the first chamber can be selected such that, when inflated, the first chamber has a size and volume sufficient to receive a load exerted by a first leg and/or knee (e.g., the left leg and/or knee) of a vehicle occupant (e.g., the front-seat occupant 14) and also provide coverage to the leg/knee to avoid or minimize any impact with surrounding vehicle compartments. As used herein, the term "vehicle outboard configuration" encompasses the configuration or geometry of a portion of a vehicle dashboard (e.g., the dashboard 20) that is towards an outboard side (e.g., the outboard side 26) of the vehicle (e.g., the vehicle 10), and/or any other vehicle compartments that are positioned on or towards the outboard side (e.g., a glove compartment of the vehicle, when the knee airbag is placed in a passenger side of the vehicle). For example, the vehicle outboard configuration can include a sweep of a lower portion of the outboard-side of the dashboard.

The method 600 can further include, at step 604, forming a second chamber (e.g., the second chamber 106) having a second width (e.g., the width L2) selected according to a vehicle inboard configuration. For example, the width of the second chamber can be selected such that, when inflated, the second chamber has a size and volume that is sufficient to receive a load exerted by a second leg and/or knee (e.g., the right leg and/or knee) of the vehicle occupant and also provide sufficient coverage to the leg/knee to minimize any impact with surrounding vehicle compartments. As used herein, the term "vehicle inboard configuration" encompasses the configuration or geometry of a portion of the vehicle dashboard that is towards an inboard side (e.g., the inboard side 28) of the vehicle and/or any vehicle compartments that are positioned on or towards the inboard side (e.g., the center console). For example, the vehicle inboard configuration can include a sweep of a lower portion of the inboard-side of the dashboard.

In embodiments, the first and second widths can be selected so that a first volume of the first chamber is larger than a second volume of the second chamber. For example, this may be achieved by selecting the first width to be greater than the second width. In some cases, the first chamber may need to have a longer width because the outboard side of the airbag has a larger coverage area than the inboard side of the airbag. Also in some cases, the first chamber may be configured to have a larger volume because, during a typical load event, the outboard side of the airbag is expected to receive more incoming energy than the inboard side.

In some embodiments, the step 602 includes providing, in the first chamber, at least one internal wall (e.g., the first baffle 124 and/or the second baffle 126) at a first distance from a first side of the airbag (e.g., an external side wall of the first chamber), where the first distance is equal to the first width. Also in some embodiments, the step 604 includes providing, in the second chamber, at least one internal wall (e.g., the first baffle 124 and/or the third baffle 128) at a second distance from a second side of the airbag (e.g., an external side wall of the second chamber), where the second distance is equal to the second width and the second side is opposite the first side. The internal walls of the first and second chambers can be configured to prevent gas flow through the walls of the chambers, thereby ensuring proper, independent inflation of each chamber.

The method 600 can also include, at step 606, forming a first vent (e.g., the first internal vent 116) for permitting a first gas flow into the first chamber. In addition, the method 600 can include, at step 608, forming a second vent (e.g., the second internal vent 118) for permitting a second gas flow into the second chamber. In embodiments, the first vent can be formed in the at least one internal wall of the first chamber, and the second vent can be formed in the at least one internal wall of the second chamber. In some embodiments, the method 600 includes, at step 610, determining a first height (e.g., the height d1) for the first vent and a second height (e.g., the height d2) for the second vent, such that the first gas flow into the first chamber is greater than the second gas flow into the second chamber. In embodiments, the first height can be selected to be greater than the second height, as the outboard side of the airbag may need to be stiffer than the inboard side, for example, in order to be capable of handling greater expected loads.

In some embodiments, the method 600 includes, at step 612, coupling at least one internal tether (e.g., the tethers 130 and/or 132) to the second chamber to restrict a depth of the second chamber relative to the first chamber. In embodiments, the at least one internal tether can be coupled to front and rear faces of the second chamber and has a width that is less than or equal to the second width of the second chamber. It may be desirable to provide the first chamber with fuller or deeper coverage than the second chamber due to the difference in configuration and stiffness of the outboard vehicle components relative to the inboard vehicle components.

In some embodiments, the method 600 includes, at step 614, providing an internal passageway (e.g., the passageway 114) for permitting gas flow from an inlet (e.g., the gas inlet) positioned at an external wall of the airbag to the first vent and the second vent. The internal passageway may be formed between the first and second chambers and may be in communication with the first vent and the second vent. A width of the internal passageway may be dependent on, or determined by, the first and second widths of the first and second chambers, and/or the widths of the internal wall(s) that define each chamber.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims. This includes any alternate implementations of the processes or methods shown in the figures, such as FIG. 7, in which functions may be executed out of order from that shown or discussed, including substantially concurrently or in reverse order, depending on the functionality involved, as would be understood by those having ordinary skill in the art.

The invention claimed is:

1. A vehicle airbag assembly, comprising:
   an airbag including a first chamber and a second chamber, the first chamber having a greater volume than the second chamber in an inflated state of the airbag;
   a first internal vent permitting gas entry into the first chamber;
   a second internal vent permitting gas entry into the second chamber, the first vent configured for a larger gas flow than the second vent; and
   one or more internal tethers coupled to the second chamber for restricting a depth of the second chamber in the inflated state.

2. The vehicle airbag assembly of claim 1, wherein a width of the first chamber is greater than a width of the second chamber.

3. The vehicle airbag assembly of claim 1, further comprising:
   a gas inlet positioned at an external wall of the airbag for inflating the airbag; and
   an internal passageway connecting the gas inlet to the first vent and the second vent.

4. The vehicle airbag assembly of claim 3, further comprising a plurality of baffles defining at least one internal wall of the first chamber and at least one internal wall of the second chamber.

5. The vehicle airbag assembly of claim 4, wherein the first vent is formed by a gap between a first baffle and a second baffle of the plurality of baffles, and the second vent is formed by a gap between the first baffle and a third baffle of the plurality of baffles.

6. The vehicle airbag assembly of claim 5, wherein the second baffle forms a lower internal wall of the first chamber and the third baffle forms a lower internal wall of the second chamber.

7. The vehicle airbag assembly of claim 5, wherein a height of the third baffle is greater than a height of the second baffle.

8. The vehicle airbag assembly of claim 5, wherein the first baffle is positioned opposite the gas inlet, and the internal passageway is formed between the second baffle and the third baffle.

9. A vehicle airbag assembly, comprising:
   an airbag including a first chamber and a second chamber, the first chamber having a greater volume than the second chamber in an inflated state of the airbag;
   a first internal vent permitting gas entry into the first chamber;
   a second internal vent permitting gas entry into the second chamber, the first internal vent configured for a larger gas flow than the second internal vent;
   a gas inlet positioned at an external wall of the airbag for inflating the airbag;
   an internal passageway connecting the gas inlet to the first internal vent and the second internal vent, and
   a plurality of baffles defining at least one internal wall of the first chamber and at least one internal wall of the second chamber.

10. The vehicle airbag assembly of claim 9, wherein a width of the first chamber is greater than a width of the second chamber.

11. The vehicle airbag assembly of claim 9, wherein the first internal vent is formed by a first gap between a first baffle and a second baffle of the plurality of baffles, and the second internal vent is formed by a second gap between the first baffle and a third baffle of the plurality of baffles.

12. The vehicle airbag assembly of claim 11, wherein the second baffle forms a lower internal wall of the first chamber and the third baffle forms a lower internal wall of the second chamber.

13. The vehicle airbag assembly of claim 11, wherein a height of the third baffle is greater than a height of the second baffle.

14. The vehicle airbag assembly of claim 11 wherein the first baffle is positioned opposite the gas inlet, and the internal passageway is formed between the second baffle and the third baffle.

* * * * *